US005407512A

United States Patent [19]

Policht

[11] Patent Number: 5,407,512

[45] Date of Patent: Apr. 18, 1995

[54] APPARATUS FOR MOUNTING PHOTOGRAPHIC PRINTS AND METHOD OF USING SAME

[75] Inventor: Stanislaw A. Policht, Closter, N.J.

[73] Assignee: Qualex Financial Corporation, Wilmington, Del.

[21] Appl. No.: 259,457

[22] Filed: Jun. 14, 1994

Related U.S. Application Data

[63] Continuation of Ser. No. 198,948, Feb. 18, 1994, abandoned.

[51] Int. Cl.[6] .......................... B42F 9/00; B42F 11/00; G03B 23/00

[52] U.S. Cl. .................................... 156/247; 156/249; 156/DIG. 23; 156/DIG. 27; 156/391; 281/44; 281/14; 283/101; 283/115; 40/535; 40/536; 40/641; 40/904; 40/361; 40/364

[58] Field of Search ......... 156/247, 249, 289, DIG. 3, 156/DIG. 1, DIG. 23, DIG. 27, 391; 281/14, 6, 7, 44, 45; 283/81, 115, 101; 40/361, 364, 904, 156, 641, 535, 536, 537

[56] References Cited

U.S. PATENT DOCUMENTS

| | | | |
|---|---|---|---|
| 291,499 | 1/1884 | De Vos | 40/358 |
| 1,290,811 | 1/1919 | Ware | 33/429 |
| 1,875,410 | 9/1932 | Babcock | 269/254 AW |
| 2,500,468 | 3/1950 | Postell | 281/44 |
| 3,057,073 | 10/1962 | Swartz | 33/180 |
| 3,566,522 | 3/1971 | Leach et al. | 40/23 |
| 3,809,386 | 5/1974 | Loersch | 270/58 |
| 3,945,559 | 3/1976 | Krautsack | 229/38 |
| 3,954,287 | 5/1976 | Osteen | 281/15 R |
| 4,369,582 | 1/1983 | Pfeffer | 33/180 R |
| 4,503,618 | 3/1985 | Eberhardt | 33/180 R |
| 4,539,759 | 9/1985 | Dowzall et al. | 33/184.5 |
| 4,580,815 | 4/1986 | Barber | 283/81 |
| 4,632,529 | 12/1986 | Levin | 353/122 |
| 4,710,084 | 12/1987 | Ludvigsen | 412/9 |
| 4,892,334 | 1/1990 | Sinclair | 281/45 |
| 4,962,603 | 10/1990 | Kao et al. | 40/641 |
| 5,016,370 | 5/1991 | Rhian et al. | 40/359 |
| 5,038,503 | 8/1991 | Goldberg | 40/156 |
| 5,183,296 | 2/1993 | Policht | 281/46 |
| 5,246,519 | 9/1993 | McCormick | 156/247 |

*Primary Examiner*—David A. Simmons
*Assistant Examiner*—Charles Rainwater
*Attorney, Agent, or Firm*—Bell, Seltzer, Park & Gibson

[57] ABSTRACT

An apparatus for accurately, efficiently, and consistently aligning a tabbing strip with the edges of the photographic print to which it is to be applied. The apparatus comprises a support panel, a tabbing strip registration guide, a photographic print registration guide, a clamping member including a linear clamp bar, and a spring for pivotally mounting the clamping member to the support panel. The present invention further provides a method of using the apparatus for accurately, efficiently, and consistently aligning a tabbing strip with the edges of the photographic print to which it is to be applied.

8 Claims, 3 Drawing Sheets

APPARATUS FOR MOUNTING PHOTOGRAPHIC PRINTS AND METHOD OF USING SAME

This application is a continuation of prior application Ser. No. 08/198,948, filed on 18 Feb. 1994, now abandoned the disclosure of which is incorporated by reference herein in its entirety.

FIELD OF THE INVENTION

The present invention relates to the field of photography, and more particularly to an apparatus for applying tabbing strips to photographic prints, and a method for using the same.

BACKGROUND OF THE INVENTION

Photograph albums for holding and displaying photographic prints having "notched tabs," or "leaves," attached to one side edge of the photograph are known. For example, U.S. Pat. No. 5,183,296 to Policht, discloses a photograph album including a U-shaped binder having first and second movable retainers which include a pair of outwardly extending tabs for engaging corresponding slots on each end of the leaves attached to the photographs. U.S. Pat. No. 3,116,738 to Wentges discloses a photograph album having leaves holding photographs with fastening edges stacked together, and an elastic band securing the leaves together by fitting into slots located on either end of the leaves.

The "leaves" or "tabs" (hereinafter "tabbing strips") are the means by which the individual photographic prints are mounted in the above-described photograph albums. Conventional methods require that the tabbing strips be applied individually, by hand, with no objective means for accurately or consistently aligning the tabbing strip with the photographic print to which it is applied. The result is that tabbing strips frequently are not properly aligned with the edges of the photographic print to which they are applied. When the misaligned tabbed photographic prints are mounted in the photograph album, the edges of the prints are not in alignment, thereby increasing the possibility of damage to those prints.

Moreover, there are a multitude of people in a plurality of locations producing the above-described photograph albums and manually applying tabbing strips to photographic prints. Currently there are no means of maintaining consistency among the tabbed photographic prints or photograph albums produced. In order to maintain the highest possible quality of photograph album, it is necessary to consistently align the tabbing strips with the photographic prints so that they may be neatly and accurately mounted in the photograph album.

Accordingly, there exists a need in the photographic industry for an apparatus and method for accurately, efficiently, and consistently aligning a tabbing strip with the edges of the photographic print to which it is to be applied.

SUMMARY OF THE INVENTION

It is therefore an object of the present invention to provide an apparatus and method for accurately, efficiently, and consistently aligning a tabbing strip with the edges of the photographic print to which it is to be applied.

This and other objects, features and advantages of the invention are provided by an apparatus for attaching a tabbing strip having one adhesive coated side edge portion, to one side edge of a photographic print, so that the tabbing strip and photographic print may be joined together in an accurately predetermined positional relationship. The photographic print having the tabbing strip attached thereto may then be mounted in an album similar to those described above. The apparatus comprises a support panel, a tabbing strip registration guide, a photographic print registration guide parallel to and space apart from the tabbing strip registration guide, a clamping member including a linear clamp bar, and means for pivotally mounting the clamping member to the support panel so that the clamp bar may be pivoted to engage a tabbing strip positioned in abutment with the tabbing strip registration guide. The apparatus may optionally comprise additional aspects, as will be described more fully herein below.

The present invention further provides a method of using the above-described apparatus to accurately, efficiently, and consistently align a tabbing strip with the side and end edges of the photographic print to which it is to be applied. The method includes positioning the tabbing strip in abutment with the tabbing strip registration guide, while the clamp bar is pivoted to the raised position; releasing and pivoting the clamp bar to the lowered position so that the clamp bar engages and supports the tabbing strip with the adhesive coating along one side edge portion of the tabbing strip positioned along the side of the clamp bar toward the photographic print registration guide; removing the cover strip from the tabbing strip and exposing the adhesive coating; positioning the photographic print in abutment with the photographic print registration guide so that one side edge of the photographic print overlies the exposed adhesive coating of the tabbing strip; and pressing the photographic print into contact with the exposed adhesive coating thereby interconnecting the tabbing strip and photographic print.

DESCRIPTION OF THE PREFERRED EMBODIMENTS

Figure 1:
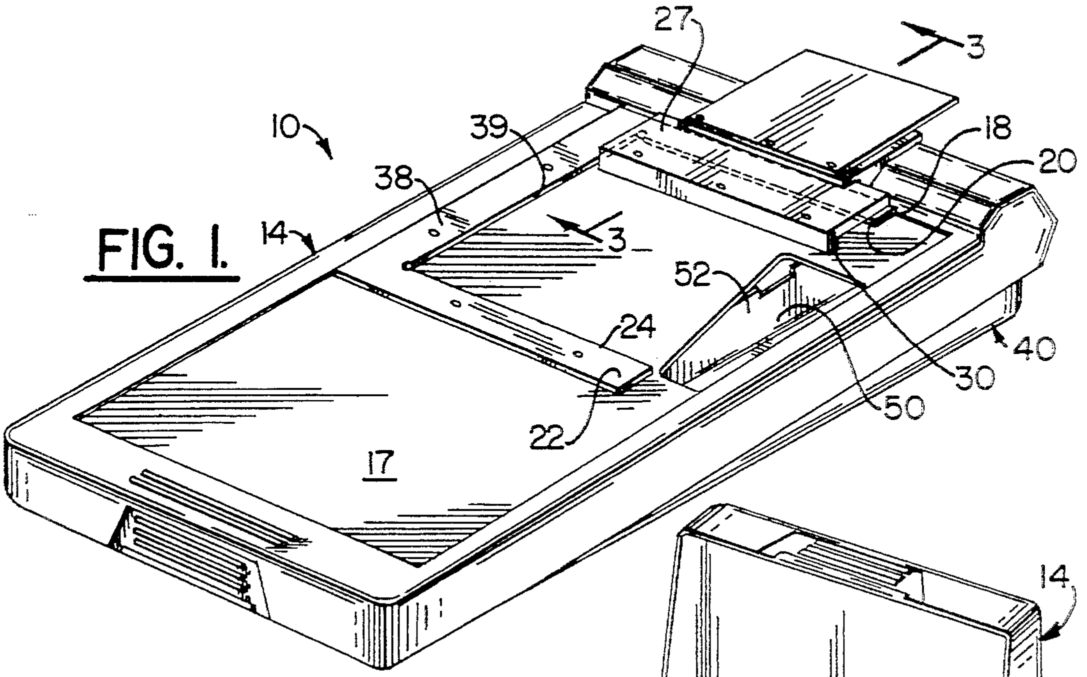
FIG. 1 is perspective view of one embodiment of the apparatus according to the invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, the application provides these embodiments so that this disclosure will be thorough and complete, and will fully convey the scope of the invention to those skilled in the art. Like numbers refer to like elements throughout.

Referring to FIGS. 1–6 and 8, there is shown an apparatus according to one aspect of the invention being generally designated as 10. The apparatus 10 may be used for attaching a tabbing strip having an adhesive coating along one side edge portion, to one side edge of a rectangular photographic print, so that the tabbing strip and photographic print may be joined together in an accurately predetermined positional relationship, and then mounted in an album of the type previously described. The apparatus 10 may be comprised of any suitable material, such as metal, plastic or wood. The apparatus 10 includes a support panel 14, defining an upper, substantially planar surface 17. A tabbing strip registration guide 18 is mounted and secured to the upper surface 17 of the support panel 14, and defines a first linear guide edge 20 on the upper surface 17. A photographic print registration guide 22 is also mounted and secured to the upper surface 17, and defines a second linear guide edge 24 on the upper surface 14. The second linear guide edge 24 is parallel to and spaced apart from the first linear guide edge 20 by a predetermined distance. The distance between the first linear guide edge 20 and the second linear guide edge 24 is predetermined so that a tabbing strip may be positioned in abutment with the first linear guide edge 20 and a photographic print may be positioned in abutment with the second linear guide edge 24 with one side edge of the photographic print overlying the adhesive along one side edge portion of the tabbing strip.

Figure 3:
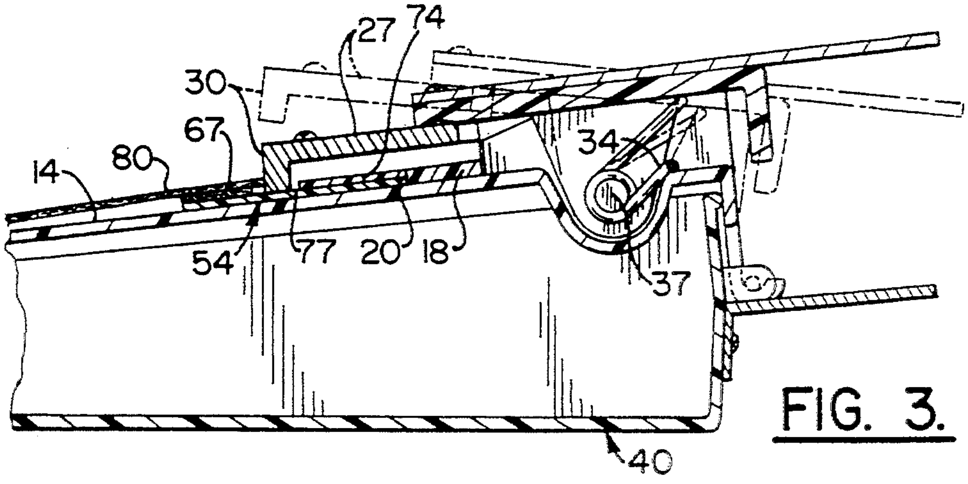
FIG. 3 is a cross-sectional view of an end portion of the apparatus, shown along lines 3—3 in FIG. 1.
Figure 4:
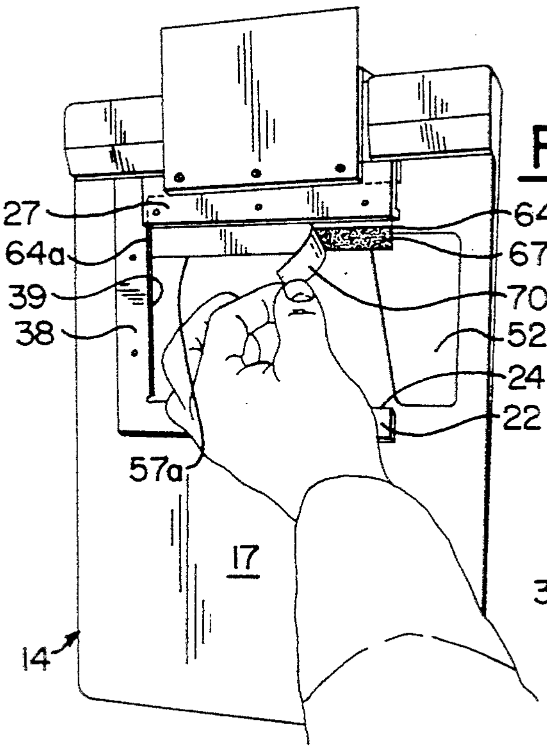
FIG. 4 is perspective view of the apparatus according to the invention, and demonstrating one step in the method of using the invention.
Figure 6:
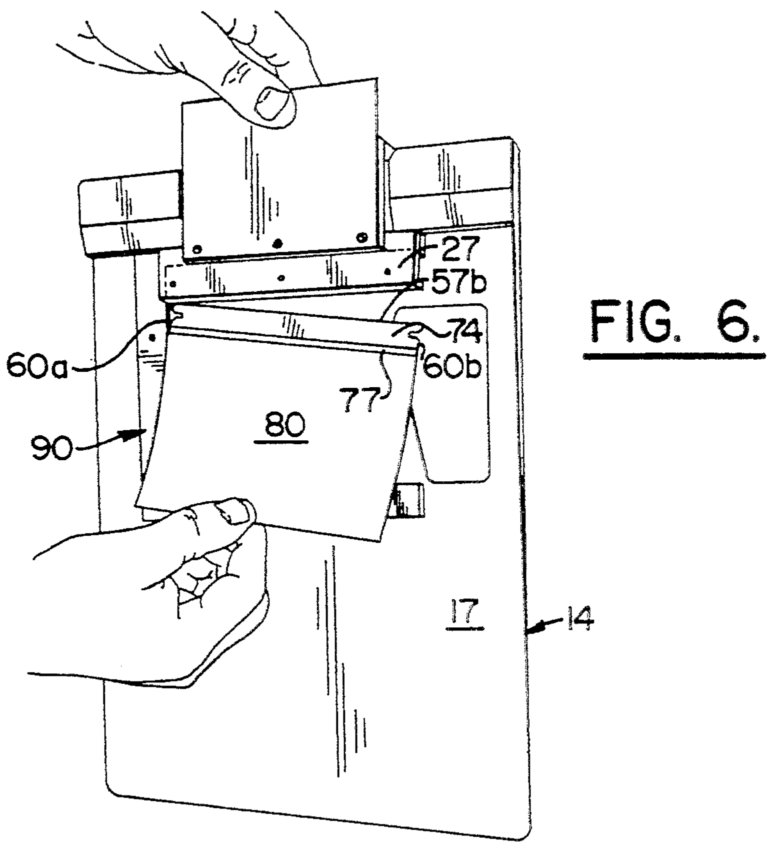
FIG. 6 is perspective view of the apparatus according to the invention, and demonstrating a step in the method of using the invention.
Figure 8:
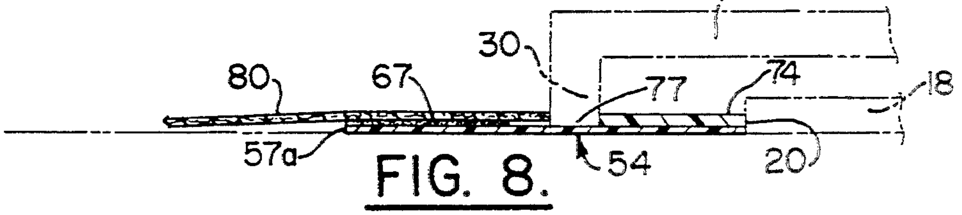
FIG. 8 is a cross-sectional view of a photographic print having a tabbing strip attached along one side edge prior to removal from the apparatus.

Referring to FIGS. 1, 3 and 8, the apparatus also comprises a clamping member 27 including a linear clamp bar 30 parallel to and disposed along the first linear guide edge 20. The clamping member 27 is pivotally mounted to the support panel 14 by a spring 34 or other means for pivotally mounting. The spring 34 allows the linear clamp bar 30 to be pivoted between a lowered, operative position, as shown in FIG. 4, and a raised, inoperative position, as shown in FIG. 6.

Referring to FIG. 3, when the linear clamp bar 30 is pivoted to the lowered operative position, the linear clamp bar 30 is disposed along the first linear guide edge 20. Being thus disposed, the linear clamp bar 30 may engage a tabbing strip which is positioned in abutment with the first linear guide edge 20. Preferably, a tabbing strip is thus engaged so that an adhesive coating along one side edge of the tabbing strip is exposed along the side of the linear clamp bar 30 toward the second linear guide edge 24. The spring 34 or other means for pivotally mounting the clamping member 27, includes a bias means 37 or other means for biasing the linear clamp bar 30 toward the lowered, operative position.

The apparatus is configured such that in use, a tabbing strip may be positioned in abutment with the first linear guide edge 20 while the clamp bar 30 is pivoted toward the raised position. The clamping member 27 may then be released so that the clamp bar 30 may engage and support the tabbing strip with the adhesive coating being exposed along the side of the clamp bar 30 toward the second linear guide edge 24. A photographic print may then be positioned in abutment with the second linear guide edge 24 so that one side edge of the photographic print overlies the exposed adhesive coating of the tabbing strip and may be readily joined thereto by being pressed thereagainst.

In the embodiment shown in FIG. 1, the apparatus further comprises a third registration guide 38 mounted to the upper surface 17 of the support panel 14. The third registration guide defines a third linear guide edge 39. The third linear guide edge 39 extends perpendicularly between the first linear guide edge 20 and the second linear guide edge 24. The third linear guide edge 39 is adapted to engage one end of a tabbing strip which is positioned in abutment with the first linear guide edge 20, and one end edge of a photographic print which is positioned in abutment with the second linear guide edge 24, and thereby accurately align both.

Figure 2:
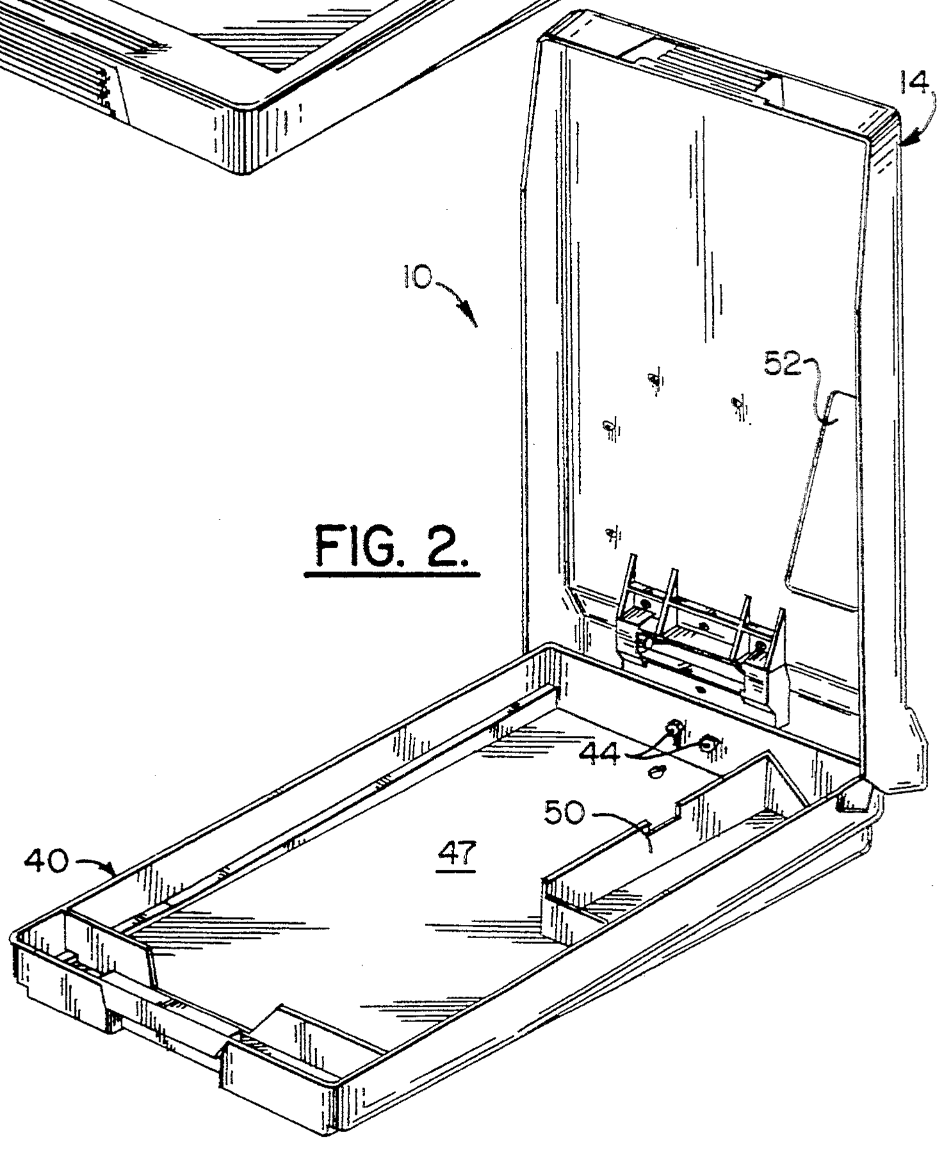
FIG. 2 is perspective view of one embodiment of the apparatus of according to the invention.

Referring to FIG. 2, the apparatus may further comprise a shallow, box-like receptacle 40. The receptacle 40 may be pivotally connected to the support panel 14 by a hinge 44 or other means for pivotally connecting the receptacle 40 to the support panel 14. Typically, the receptacle 40 is pivotally connected to the support panel 14 such that the receptacle 40 underlies the upper surface 17 of the support panel 14 on the opposite upper surface 17. Preferably, the receptacle 40 is pivotally connected to the support panel 14 and underlies the upper surface 17 of the support panel 14, such that the support panel 14 may be pivoted between a lowered position closing the receptacle 40, and a raised position permitting access to the interior 47 of the receptacle 40. FIG. 1 shows the support panel 14 in the lowered position, closing the underlying receptacle 40. FIG. 2 shows the support panel 14 in the raised position, permitting access to the interior 47 of the receptacle 40.

As shown in FIGS. 2 and 4–6, another aspect of the invention comprises a receptacle 40 including a storage compartment 50, and a support panel 14 having an aperture 52 therethrough. The storage compartment 50 is useful for storing supplies such as tabbing strips which are typically used in the method of the present invention, as described hereinbelow. In a preferred embodiment, the receptacle 40 including the storage compartment 50 underlies the upper surface 17 of the support panel 14 such that the storage compartment 50 of the receptacle 40 is aligned with and underlies the aperture 52 through the support panel 14. The aperture 52 aligned with the storage compartment 50 permits ready access to the storage compartment 50 when the support panel 14 is pivoted to the lowered position, thereby closing the receptacle 40.

The present invention also provides a method for accurately, efficiently, and consistently preparing a photographic print having a tabbing strip attached along one side, so as to permit the photographic print to be mounted in an album of the type previously described.

Referring to FIGS. 4–8, the method of the present invention is illustrated. The method comprises providing an elongate tabbing strip 54 having opposite side edges **57*a*, 57*b*, opposite side edge portions 60*a*, 60*b* extending along respective side edges, and opposite ends 64*a*, 64*b*. The tabbing strip 54 may be comprised of any suitable flexible sheet material. Exemplary materials include polyethylene or polypropylene. The tabbing strip 54 includes an adhesive coating 67 applied along one side edge portion 60*a* and a cover strip 70 releasably overlying the adhesive coating 67**.

Figure 7:
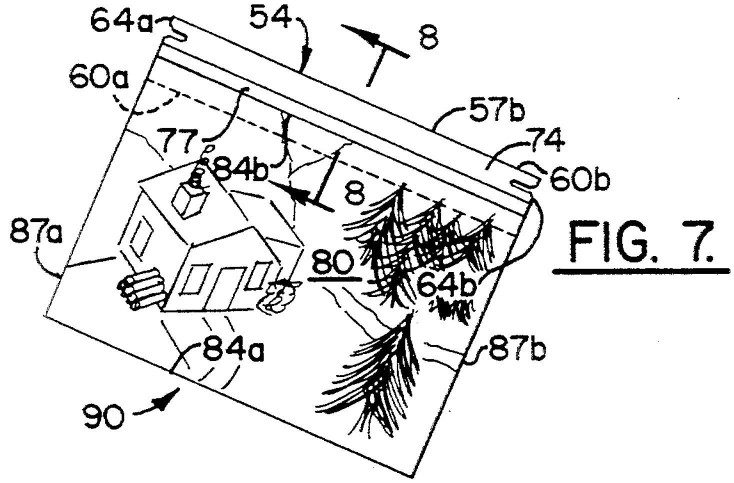
FIG. 7 is a perspective view of a photographic print having a tabbing strip attached along one side edge.

As shown in FIG. 7, in a preferred embodiment, the tabbing strip 54 also includes a reinforcing strip 74 adhered along the side edge portion **60*b* of the tabbing strip 54 opposite the adhesive coating 67 and cover strip 70. Typically, the reinforcing strip 74 is spaced apart from the adhesive coating 67 and cover strip 70, so that the portion of the tabbing strip 54 between the reinforcing strip 74 and the adhesive coating 67 and cover strip 70 provides a flexible hinge 77**.

Figure 5:
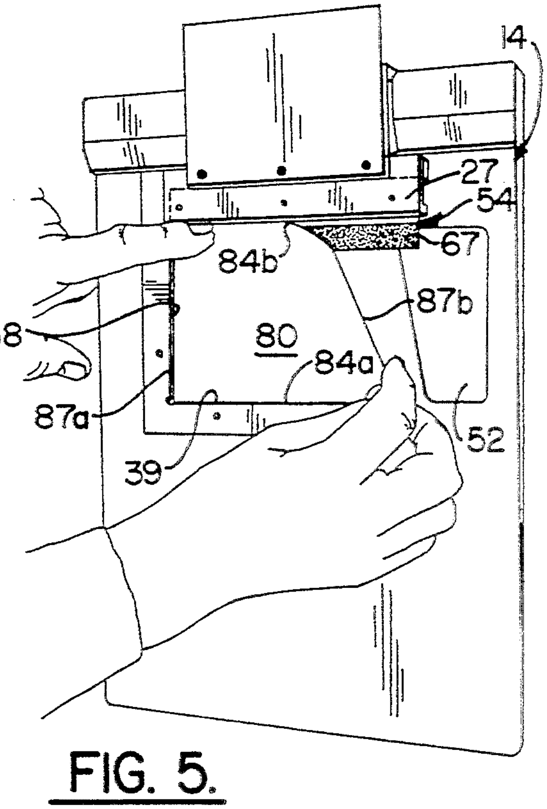
FIG. 5 is perspective view of the apparatus according to the invention, and demonstrating a step in the method of using the invention.

Referring to FIGS. 4–6 While the linear clamp bar 30 is pivoted toward the raised position, the tabbing strip 54 may be positioned in abutment with a first linear guide edge 20. The first linear guide edge 20 is defined by a tabbing strip registration guide 18 mounted on an upper surface 17 of a substantially planar support panel 14. The tabbing strip 54 is positioned such that the side edge **57*b* of the tabbing strip 54 opposite the adhesive coating 67 and cover strip 70 is in abutment with the first linear guide edge 20. The tabbing strip 54 is positioned such that the adhesive coating 67 and the cover strip 70 lie on the side of the tabbing strip 54 opposite the upper surface 17**.

In another embodiment, the method further comprises positioning the tabbing strip 54 as described above, and also such that one end **64*a* of the tabbing strip 54 is in abutment with a third linear guide edge 39. The third linear guide edge 39 is defined by a third registration guide 38 mounted on the upper surface 17 of the support panel 14. The third registration guide 38 and third linear guide edge 39, extend perpendicularly between the first linear guide edge 20 and the second linear guide edge 24. The tabbing strip 54** is thereby accurately aligned for attachment to a photographic print.

With the tabbing strip 54 thus positioned, the clamping member 27 may be released and the linear clamp bar 30 pivoted toward the lowered, operative position, as best shown in FIGS. 4 and 8. By pivoting the linear clamp bar 30 toward the lowered position, the thus positioned tabbing strip 54 may be supported and engaged along a line parallel to the first linear guide edge 20, with the linear clamp bar 30. The tabbing strip 54 is engaged by the linear clamp bar 30 so that the adhesive coating 67 and the cover strip 70 are exposed on the side of the clamp bar 30 opposite the first linear guide edge 20 and toward the second linear guide edge 24. The thus positioned tabbing strip 54 is thereby supported by being pressed into contact with the upper surface 17 of the support panel 14. Thereafter, the cover strip 70 may be removed to expose the underlying adhesive coating 67, as shown in FIG. 4.

Referring to FIG. 5, with the tabbing strip 54 thus positioned and supported by the linear clamp bar 30, the photographic print 80 may be positioned for attachment thereto. The photographic print 80 is typically rectangular in shape, having opposite side edges **84*a*, 84*b* and opposite end edges 87*a*, 87*b*. The photographic print is positioned such that one side edge 84*a* is in abutment with a second linear guide edge 24. The second linear guide edge 24 is defined by a photograph print registration guide 22 which is mounted on the upper surface 17 of the support panel 14 parallel to and spaced apart from the first linear guide edge 20 by a predetermined distance. The predetermined distance is of sufficient size such that when one side edge 84*a* of the photographic print 80 is positioned in abutment with the second linear guide edge 24, the opposite side edge 84*b* of the photographic print 80 overlies the exposed adhesive coating 67 along one side edge portion 60*a* of the tabbing strip 54**.

In another embodiment, the method further comprises positioning the photographic print 80 as described above, and also such that one end edge **87*a* is in abutment with the third linear guide edge 39. The third linear guide edge 39 is defined by a third registration guide 38 mounted on the upper surface 17 of the support panel 14. The photographic print 80 is thereby accurately aligned with the previously positioned tabbing strip 54**.

The tabbing strip 54 and photographic print 80 thus positioned, may be readily joined by pressing the photographic print into contact with the exposed adhesive coating 67 of the tabbing strip 54. The photographic print 80 and tabbing strip 54 are thereby interconnected along the side edge **84*b* of the photographic print 80 opposite the side edge 84*a* previously positioned in abutment with the second linear guide edge 24**.

Referring to FIG. 6, the method of the present invention may comprise the further subsequent step of releasing the engagement of the linear clamp bar 30 with the tabbing strip 54 by pivoting the linear clamp bar 30 to the raised inoperative position, and thereby releasing the prepared photographic print having a tabbing strip attached along one side edge 90.

Another aspect of the present invention comprises a method of preparing a photographic print having a tabbing strip attached along one side edge 90, wherein the tabbing strip 54 further comprises a reinforcing strip 74 adhered along the side edge portion **60*b* of the tabbing strip 54 opposite the adhesive coating 67**.

Yet another aspect of the invention comprises a method of preparing a photographic print having a tabbing strip attached along one side edge 90, and a flexible hinge 77 between the reinforcing strip 74 of the tabbing strip 54 and the photographic print 80. According to this aspect of the invention, the reinforcing strip 74 is spaced apart from the adhesive coating 67 and cover strip 70. The photographic print 80 is positioned as previously described and also such that the opposite side edge **84*b* of the photographic print 80 is spaced apart from the reinforcing strip 74. The portion of the tabbing strip 54 between the reinforcing strip 74 and the opposite side edge 84*b* of the photographic print 80 provides a flexible hinge 77**.

According to the foregoing inventive method using the inventive apparatus, a tabbing strip and photographic print may be joined in an accurately predetermined positional relationship, as shown in FIG. 7, and the photographic print may then be mounted in an album of the type previously described, by means of the tabbing strip.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An apparatus for attaching a tabbing strip having an adhesive coating along one side edge portion, to one side edge of a rectangular photographic print, so that the tabbing strip and photographic print may be joined together in an accurately predetermined positional relationship, and such that the photographic print having the tabbing strip attached thereto may then be mounted in an album by means of the tabbing strip, the apparatus comprising:

a shallow box-like receptacle;

a support panel defining an upper, substantially planar surface;

means for pivotally connecting said receptacle to said support panel such that said receptacle underlies the upper surface of said support panel opposite the upper surface, and such that said support panel may be pivoted between a lowered position closing said receptacle and a raised position permitting access to the interior of said receptacle;

a tabbing strip registration guide mounted to the upper surface of said support panel and defining a first linear guide edge on said upper surface;

a photographic print registration guide mounted to the upper surface of said support panel and defining a second linear guide edge on the upper surface which is parallel to and spaced apart from said first linear guide edge by a predetermined distance, so that the tabbing strip may be positioned in abutment with said first linear guide edge and the photographic print may be positioned in abutment with said second linear guide edge, with one side edge of the photographic print overlying the adhesive coating along one side edge portion of the tabbing strip;

a clamping member including a linear clamp bar, wherein said linear clamp bar is substantially as long as the tabbing strip;

means for pivotally mounting said clamping member to said support panel so that said linear clamp bar may be pivoted between a lowered operative position wherein said linear clamp bar is disposed along said first linear guide edge and may engage the tabbing strip when the tabbing strip is in abutment with the first linear guide edge such that the adhesive coating along said side edge portion of the tabbing strip is exposed along the side of the linear clamp bar toward said second linear guide edge, and a raised inoperative position, said means for pivotally mounting said linear clamping member also including a means for biasing said linear clamp bar toward the lowered operative position;

whereby in use, the tabbing strip may be positioned in abutment with said first linear guide edge while said clamp bar is pivoted toward the raised position, said clamping member may then be released so that said clamp bar may engage and support the tabbing strip with the adhesive coating being exposed along the side of said clamp bar toward said second linear guide edge, and the photographic print may then be positioned in abutment with said second linear guide edge so that one side edge of the photographic print overlies the exposed adhesive coating of the tabbing strip and may be readily joined thereto by being pressed thereagainst.

2. The apparatus as defined in claim 1 further comprising a third registration guide mounted to the upper surface of said support panel and defining a third linear guide edge, which extends perpendicularly between said first and second linear guide edges, and is adapted to engage one end of the tabbing strip and one end edge of the photographic print so as to accurately align the same.

3. The apparatus as defined in claim 1 wherein said receptacle includes a storage compartment for storing a plurality of tabbing strips, and said support panel includes an aperture therethrough which is aligned with said storage compartment for permitting ready access to said storage compartment when said support panel is pivoted to the lowered position.

4. A method of preparing a rectangular photographic print having opposite side edges and opposite end edges, and having a tabbing strip attached along one side edge, so as to permit the photographic print to be mounted in an album, said method comprising the steps of:

providing an elongate tabbing strip of flexible sheet material having opposite side edges, opposite side edge portions extending along respective side edges, and opposite ends, said tabbing strip having an adhesive coating applied along one of the side edge portions, and a cover strip releasably overlying said adhesive coating;

positioning the side edge of said tabbing strip which is opposite said adhesive coating, in abutment with a first linear guide edge which is positioned on an upper surface of a support panel such that the adhesive coating and the cover strip lie on the side of the tabbing strip opposite the upper surface;

engaging the thus positioned tabbing strip along a line parallel to said first linear guide edge, with a linear clamp bar so that the adhesive coating and the cover strip are exposed on the side of the clamp bar opposite said first linear guide edge, and so that the tabbing strip is pressed into contact with the upper surface;

removing the cover strip from the tabbing strip and exposing the adhesive coating;

positioning one side edge of the photographic print in abutment with a second linear guide edge on the upper surface which second linear guide edge is parallel to and spaced apart from said first linear guide edge by a predetermined distance, such that the opposite side edge of the photographic print overlies the side edge portion of the tabbing strip having the exposed adhesive coating; and then pressing the photographic print into contact with the exposed adhesive coating so as to interconnect the tabbing strip along the opposite side edge of the photographic print.

5. The method as defined in claim 4 wherein said step of positioning the tabbing strip includes positioning one end of the tabbing strip in abutment with a third linear guide edge, defined by a third registration guide which is mounted on the upper surface of said support panel, which extends perpendicularly between said first and second linear guide edges, and wherein said step of positioning the photographic print includes positioning one end edge of the photographic print in abutment with said third linear guide edge so as to accurately align said tabbing strip and photographic print.

6. The method as defined in claim 5 comprising the further subsequent step of releasing the engagement of said clamp bar with the tabbing strip and releasing the prepared photographic print and tabbing strip.

7. The method as defined in claim 6 wherein the tabbing strip further comprises a reinforcing strip adhered along the side edge portion of the tabbing strip opposite the adhesive coating and cover strip.

8. The method as defined in claim 7 wherein the reinforcing strip is spaced apart from the adhesive coating and cover strip, and wherein said photographic print positioning step includes positioning the opposite side edge of the photographic print spaced apart from the reinforcing strip so that the portion of the tabbing strip between the reinforcing strip and the opposite side edge of the photographic print provides a flexible hinge.

* * * * *